United States Patent [19]

Kelly et al.

[11] 3,793,005
[45] Feb. 19, 1974

[54] REDUCTION OF NICKEL OXIDE IN A ROTARY HEARTH FURNACE

[75] Inventors: Daniel Kelly, Clarkson, Ontario, Canada; Walter Curlook, Neuilly, France; Malcolm Charles Evert Bell, Oakville, Ontario, Canada

[73] Assignee: The International Nickel Company, Inc., New York, N.Y.

[22] Filed: July 2, 1971

[21] Appl. No.: 159,289

[30] Foreign Application Priority Data
July 8, 1970 Canada .................................. 87696

[52] U.S. Cl. .................................................. 75/82
[51] Int. Cl. ........................................... C22b 23/02
[58] Field of Search ......................................... 75/82

[56] References Cited
UNITED STATES PATENTS

| | | | |
|---|---|---|---|
| 3,503,735 | 3/1970 | Beggs et al. | 75/82 X |
| 3,425,824 | 2/1969 | Heitmann | 75/33 |
| 2,473,795 | 6/1949 | Hills et al. | 75/82 |
| 3,030,201 | 4/1962 | Queneau | 75/31 X |
| 2,850,376 | 9/1958 | Queneau et al. | 75/82 |
| 1,871,848 | 8/1932 | Gustafsson | 75/38 X |
| 1,983,604 | 12/1934 | Flannery | 75/38 X |
| 3,443,931 | 5/1969 | Beggs et al. | 75/33 |
| 3,535,105 | 10/1970 | Archibald | 75/31 X |
| 3,656,934 | 4/1972 | Curlook et al. | 75/31 X |
| 3,188,196 | 6/1965 | Skelly | 75/40 |
| 3,667,933 | 6/1972 | Heitmann | 75/82 |

FOREIGN PATENTS OR APPLICATIONS 3,656,935  4/1972  United States Of America.. 75/31 X

*Primary Examiner*—Hyland Bizot
*Assistant Examiner*—M. J. Andrews
*Attorney, Agent, or Firm*—Maurice L. Pinel

[57] ABSTRACT

Briquetted compounds selected from the group consisting of nickel oxide, cobalt oxide and compounds heat decomposable thereto, particularly at temperatures below 1,000°C., are fed to a rotary hearth furnace to form a static shallow bed of briquettes that is heated by radiation and convection to a temperature between about 750°C. and 1,000°C. and is treated with a carbonaceous reductant to reduce the compound to metal. Advantageously, the carbonaceous reductant is incorporated in the briquettes and is a liquid hydrocarbon.

10 Claims, 1 Drawing Figure

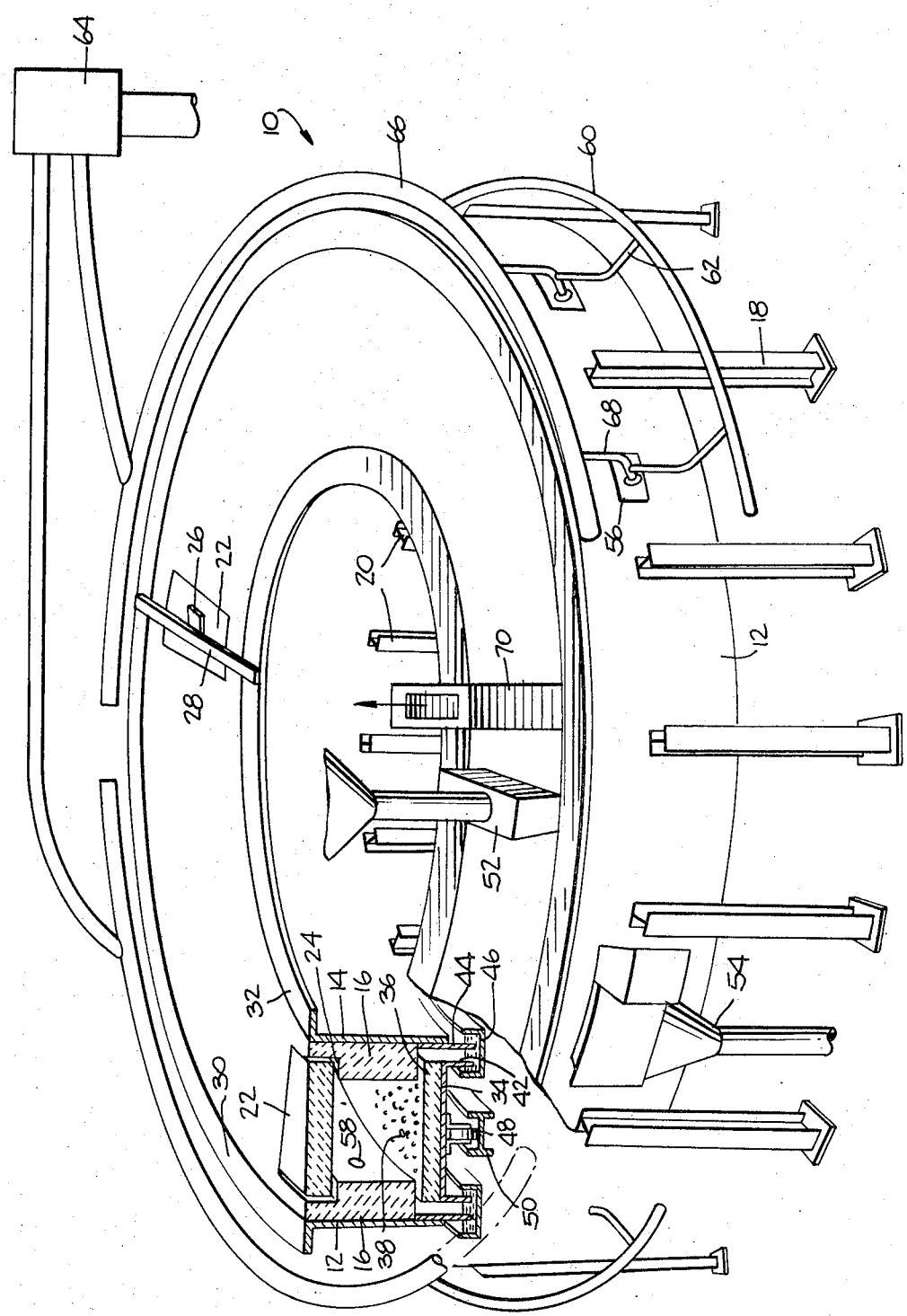

REDUCTION OF NICKEL OXIDE IN A ROTARY HEARTH FURNACE

The present invention pertains to the reduction of metal oxides, and more particularly, to the reduction of oxides, hydroxides and carbonates of nickel and cobalt without fusion.

Nickel and cobalt are frequently recovered from sulfide and oxide ores by hydrometallurgical techniques. After purification of a pregnant leach solution containing nickel and/or cobalt, the solution is treated for nickel and/or cobalt recovery. Often nickel and cobalt are recovered from the pregnant leach solution or from a more concentrated and purified solution by precipitation of the nickel and cobalt values as hydroxides or basic carbonates. For example, nickelferous oxide ores can be selectively reduced, leached with an aerated ammoniacal ammonium carbonate solution and the pregnant solution can be distilled to precipitate basic corbonates of nickel and cobalt. Likewise, if a nickeliferous sulfide or oxide ore is treated by acid leaching techniques, the nickel and cobalt values in the pregnant solution can be recovered by precipitation as hydroxides by the addition of a base such as soda ash. In current practice, basic nickel carbonates or hydroxides are heated in externally fired rotary kilns to drive off residual moisture and to decompose the hydroxides and carbonates to nickel and cobalt oxides. The resulting product is finely divided and a considerable amount is carried out of the unit as dust. Fine nickel oxide is desired in some applications but in many instances a coarse reduced nickel product is highly desirable. Although many attempts have been made to overcome the foregoing difficulties and other disadvantages, none, as far as we are aware, has been entirely successful when carried into practice commercially on an industrial scale.

It has now been discovered that oxides, hydroxides and carbonates of nickel and cobalt can be efficiently reduced to provide a dust-free agglomerate of nickel and/or cobalt in which substantially all the nickel or cobalt is in the metallic state.

The principal object of the present invention is to provide a process for reducing oxides and compounds heat decomposable to oxides of nickel and cobalt without fusion and without encountering dusting problems.

Another object of the present invention is to provide a process for reducing oxides of nickel and cobalt without fusion and without encountering sticking whenever the oxides are rapidly heated to reducing temperatures by radiation.

Other objects and advantages will become apparent from the following description taken in conjunction with the FIGURE which is a pictorial view, partly sectional, of a rotary hearth furnace that can be employed for reducing nickel and cobalt oxides and compounds heat decomposable thereto.

Generally speaking, the present invention contemplates the process for reducing metal compounds. The process comprises feeding at least one pelletized metal compound selected from the group consisting of nickel oxide, cobalt oxide and compounds heat decomposable thereto to a refractory lined hearth to form a shallow bed of pellets thereon. In order to minimize the problems associated with dusting and sticking, the conditions within the shallow bed are maintained in a static state. The hearth with the shallow bed of pellets thereon is moved through a confined space to rapidly heat the bed to a temperature between about 750°C. and 1,100°C. by radiation and convection. The confined space, in the nature of a tunnel, is defined by refractory-lined walls and is constructed and dimensioned to enhance radiative heating. At a plurality of points within the confined space, fuel is burned with a free oxygen-containing gas to generate heat, and the pellets are treated with a carbonaceous reductant to reduce the metal compound to metallic pellets by the time the hearth is moved through the confined space.

Metal compounds that can be treated in accordance with the present invention include nickel oxide, cobalt oxide, nickel hydroxide, cobalt hydroxide, nickel carbonate, cobalt carbonate, basic nickel carbonate, basic cobalt carbonate, nickel nitrate and cobalt nitrate. In fact, all compounds of nickel and cobalt that are heat decomposable at temperatures below about 1,000°C. to oxides can be treated in accordance with the process of the present invention. Compounds of nickel and cobalt that contain substantial amounts of sulfate radicals can be treated in accordance with the present invention, but there exists the possibility that the sulfate radical will be reduced to the sulfide state whereby the reduced product will contain substantial amounts of sulfur. Although cobalt oxide and all compounds heat decomposable at temperatures below 1,000°C. to nickel oxide and cobalt oxide can be reduced to metallic nickel or cobalt, portions of the following description will refer merely to nickel oxide but such reference is only for the sake of simplicity and not for the purpose of limiting the invention. It is to be noted that all solid and liquid compositions given herein are taken on a weight basis whereas gaseous compositions and ratios are given on a volumetric basis.

An important feature of the present invention is the ability to reduce nickel oxide without encountering the problems associated with dusting and sticking or agglomeration in the reduction furnace. The problems of dusting and sticking are both minimized or completely avoided by treating nickel oxide in pelletized or briquetted form. It might also be noted that the use of briquetted nickel oxide facilitates heating by radiation since comparatively deep beds can be formed of briquettes without destroying the ability to heat the bed by radiation whereas a bed of finely divided materials of equal depth forms a blanket that lowers the effectiveness of radiation heating. As used herein, the terms "pelletized" or "briquetted" include all forms of nickel oxide that have been agglomerated in one manner or another. Thus, particulate nickel oxide that has been pelletized, briquetted or extruded can be treated in accordance with the present invention, advantageously the pelletized nickel oxide has individual pellets that have a minimum dimension of 10 millimeters and advantageously at least about 30 millimeters.

An advantageous embodiment of the present invention is the incorporation of a reducing reagent within the briquettes of nickel oxide. Reducing reagents that can be incorporated into the briquettes include particulate solid carbonaceous reductants, such as coal, coke and charcoal and liquid hydrocarbons, such as oil. A highly advantageous embodiment of the present invention is the use of liquid hydrocarbons, particularly Bunker C oil in the briquetting operation. The use of liquid hydrocarbons in the briquettes has numerous advantages. For example, less water as a binder is required in forming the briquettes thereby lowering the overall heat requirements of the process since water for binding does not have to be vaporized. In addition, upon heating the volatile constituents of the hydrocarbons, as well as volatile products of cracking produce kinetically active reducing atmospheres within the briquettes where such atmospheres are most effective. Moreover, the kinetically active reducing atmospheres are not destroyed by vaporization of binding water, which water vapor by its oxidizing nature can render the reducing atmosphere less kinetically active. When liquid hydrocarbons are incorporated in the pellets during pelletizing, they are added in amounts up to about 12 percent, and advantageously in amounts between about 7 percent and 10 percent.

When carbonaceous reductants are added to the briquettes of nickel oxide, they can be added within wide limits. Carbonaceous reductants can be added in amounts up to, including and in a slight excess of that required to satisfy the stoichiometry of the reduction reactions. Although large excesses of carbonaceous reductants can be incorporated in the nickel oxide briquettes to partially satisfy full requirements, such a procedure is not desirable in that the metallic product can be unduly contaminated with carbon. For example, when liquid hydrocarbons are incorporated in the briquettes, they are added in amounts up to about 12 percent and advantageously in amounts between about 7 percent and 10 percent. If approximately stoichiometric amounts of carbonaceous reductants are incorporated in the briquettes, the atmosphere above the bed of briquettes can be slightly oxidizing, neutral or reducing with neutral to slightly reducing atmosphere being advantageous from the standpoint of fuel economy and overall efficiency. When carbonaceous reductants are not incorporated in the briquettes, the briquettes are reduced to metallic nickel by providing a reducing atmosphere having a reducing potential equivalent to a carbon monoxide to carbon dioxide ratio between about 1:2 and 2:1.

Another important feature of the present invention is the nature of the bed formed by the pelletized or briquetted nickel oxide. Pelletized nickel oxide is fed to a refractory-lined moving hearth to establish a shallow bed of pellets with the conditions within the bed being static. The depth of the bed, e.g., generally less than about 12 centimeters and advantageously less than about 9 centimeters, is important in that radiative heating and gas permeation through the bed are more effective. The static condition of the briquettes within the bed is highly important in that dusting problems associated with moving beds are minimized and the problems associated with sticking, particularly those problems attributable to impact welding, are also minimized.

The moving hearth is passed through a confined space that is advantageously constructed to facilitate radiative and convective heating. In most instances, the confined space will be in the nature of a tunnel and the moving hearth will pass through the tunnel. The interior of the tunnel is refractory lined in order to withstand the reduction temperatures and to provide a radiative surface. The confined space including the refractory lined tunnel, the refractory lined hearth and the shallow bed of pellets is heated to a temperature between about 750°C. and 1,000°C. and advantageously between about 900°C. and 1,000°C. Heating and maintaining the confined space and the shallow bed of briquettes to the foregoing temperatures is accomplished by burning fuel with conventional burners at a plurality of points within the confined space to generate the requisite heat and to produce a reducing atmosphere. Advantageously, the fuel is either gaseous, e.g., natural gas, coke oven gas, producer gas, carbon monoxide or hydrogen, or liquid, such as heavy fuel oil. The fuel is burned in a conventional burner with sufficient amounts of oxygen to produce reducing atmospheres having slightly reducing to reducing characteristics, e.g., a reducing potential equivalent to a carbon monoxide to carbon dioxide ratio between about 1:2 and 2:1 when the briquettes of nickel oxide contain little or no reductant. Although reducing atmospheres having lower reducing potentials can be employed, the kinetics of the reduction reaction would be uneconomically slow. Reducing atmospheres having higher reducing potentials can be employed but their generation by the combustion of liquid hydrocarbons presents certain operational difficulties. When reductants are incorporated in the nickel oxide briquettes, the atmosphere above the bed of briquettes is maintained neutral to slightly oxidizing. Advantageously, when a plurality of burners are employed the burners near the briquette charging end of the furnace are operated to produce atmospheres that are slightly oxidizing so that unconsumed reducing constituents are burned to provide heat while those burners nearer the discharging end of the furnace are operated to produce more reducing atmospheres so that the reduced briquettes are not reoxidized. For both thermal and chemical considerations, it is advantageous to establish countercurrent flow between the reducing atmosphere and the shallow bed of pellets on a moving hearth with the reducing atmosphere being progressively combusted to provide heat.

Advantageously, the process in accordance with the present invention is conducted in a rotary hearth furnace as depicted in the FIGURE. The furnace includes circular steel walls 12 and 14 that are lined with a suitable refractory 16. Rotary hearth furnace 10 is supported by beams 18 and 20 fixedly mounted to walls 12 and 14. The top of rotary furnace 10 can be suitable refractories 22 that form a gas seal with shoulders 24 of refractory 16. Refractory 22 can be suspended by support means 26 and rod 28 which rests on flanges 30 and 32 of walls 12 and 14.

Rotary hearth is an annular shaped steel plate 34 that is lined with refractory 36 on which a static bed of pellets 38 is carried. Vertically depending flanges 42 and 44 that depend from refractories 16 and 36 are submerged in water trough 46 to form a gas seal. Rotary hearth 34 is also provided with steel wheel 48 that rides in thrust bearings 50 when rotary hearth 34 is rotated by means not shown in the drawing. Pelletized nickel oxide is fed to rotary hearth furnace 10 via feed hopper 52, and reduced pellets of nickel metal are discharged by discharge mechanism 54.

Rotary hearth furnace 10 including refractories 16, 22 and 36 are heated by combustion of fuel with a free oxygen-containing gas in a plurality of burners 56 which discharge the products of combustion into the furnace via port 58. Fuel, preferably gas, is fed to burners 56 by gas header 60 and conduit 62 while free oxygen-containing gas to support combustion is distributed to burners 56 by blower 64 through headers 66 and conduits 68. Fuel and free oxygen-containing gases are combusted in burners 56 to generate sufficient heat to maintain the static bed of nickel oxide pellets 38 at operating temperatures and to generate a reducing atmosphere. The spent atmosphere is discharged from rotary hearth furnace via exhaust ducts 70.

In operation, pelletized nickel oxide is fed to feed hopper 52 and a shallow bed of nickel oxide pellets is formed on refractory 36 of rotary hearth 34 which is rotated, as shown in the drawing, in a counterclockwise direction. The shallow bed of nickel oxide pellets 38 is heated to a temperature between about 750°C. and 1,100°C. by convection and by radiation from refractory linings 16, 22 and 36. Fuel, such as natural gas, and a free oxygen-containing gas, such as air, are combusted in a plurality of burners 56 and discharged into the rotary hearth furnace 10 via burner ports 58 to generate sufficient heat to maintain bed 38 at operating temperatures. When the briquettes do not have reductants incorporated therein, burners 56 are operated to generate an atmosphere having a reducing potential equivalent to a carbon monoxide to carbon dioxide ratio between about 1:2 and 2:1, with the more oxidizing potentials generated near the charging end and the more reducing potentials generated at the discharging end. With reductants incorporated in the briquettes of nickel oxide burners 56 are operated to generate neutral to oxidizing potentials from the discharge end of the furnace to the charging end thereof. Advantageously, the reducing atmosphere travels in a clockwise direction to establish countercurrent flow to increase both chemical and thermal efficiencies. Not only does the countercurrent flow of gases provide more efficient heat utilization but the continuous nature of the rotary hearth insures that the briquetted oxide is fed to the hearth that is at the discharge temperature, i.e., briquettes are fed to the rotary hearth that is at a temperature of at least about 750°C. (advantageously at temperature up to 1,000°C.). The combustion products and gas from the decomposition of heat decomposable compounds are discharged from the furnace via exhaust port 70. Reduced nickel oxide is discharged into discharge hopper 54.

For the purpose of giving those skilled in the art a better understanding of the invention the following illustrative example is given:

EXAMPLE I

A rotary hearth unit similar to that depicted in the FIGURE and 4.25 meters in diameter and comprising a closed hearth with an inside diameter of 2.75 meters and an outside diameter of 3.5 meters, giving a hearth which is effectively 70 centimeters wide and provides a heated hearth area of 5.6 square meters was heated with 12 natural gas burners spaced around the outside of the wall and projecting into the processing chamber. Basic nickel and cobalt carbonate precipitated from an ammoniacal leach liquor was dried to 28 percent free moisture and mixed with 8 percent Bunker C oil per weight of the dry carbonate. The mixture of basic carbonates and Bunker C oil was briquetted by conventional techniques into pillow shaped briquettes 25 m.m. by 37.5 m.m. by 43.8 m.m. containing on a dry weight basis 0.24 percent copper, 46.8 percent nickel, 1.86 percent cobalt, 0.29 percent iron, 1.24 percent sulfur and 7.4 percent carbon. The briquettes were fed to the rotary hearth furnace to form a bed 5 c.m. to 7.5 c.m. deep at a rate of 8.35 kilograms per minute. The temperature of the refractory hearth was maintained from 950°C. to 980°C. during the test. The nickel product was removed from the hearth at 925°C. and quenched in water. The metallic product contained 0.2 percent oxygen for a nickel reduction to the metallic state of 99.2 percent. The gas left the kiln at 705°C. and analyzed 3 percent carbon monoxide, 3 percent hydrogen and 16 percent carbon dioxide on a dry basis. The composition of the gas in the reducing end was 4 percent carbon monoxide, 4 percent hydrogen and 14 percent carbon dioxide. No dust was obtained in the exit gas.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for reducing metal compounds which comprises: feeding briquettes of at least one metal compound selected from the group consisting of nickel oxide, cobalt oxide and compounds heat decomposable thereto and a liquid hydrocarbon reductant to a refractory-lined hearth to form a shallow bed of briquettes thereon, maintaining the briquettes on the refractory-lined hearth in a static state and moving the refractory-lined hearth with the shallow bed of briquettes thereon through a heated confined space to rapidly heat the bed to a temperature between about 750°C. and 1,000°C. by radiation and convection to reduce the metal compound to metallic briquettes by the time the hearth is moved through the confined space.

2. The process as described in claim 1 wherein the moving hearth is continuous, the metallic briquettes are discharged from the furnace at a temperature of at least about 750°C., and the briquetted compound is fed to the continuous hearth which is at a temperature of at least about 750°C.

3. The process as described in claim 1 wherein the liquid hydrocarbon is Bunker C oil.

4. The process as described in claim 3 wherein the liquid hydrocarbon is are added to the briquettes in amounts to substantially satisfy the stoichiometry of the reduction reactions.

5. The process as described in claim 3 wherein the liquid hydrocarbons are added to the briquettes in amounts less than is necessary to satisfy the stoichiometry of the reduction reactions and the briquettes are heated to a temperature between about 750°C. and 1,000°C. by burning a fuel to produce a slightly reducing atmosphere.

6. The process as described in claim 3 wherein the liquid hydrocarbons are added to the briquettes in amounts in excess of that necessary to satisfy the stoichiometry of the reduction reactions and the briquettes are heated to a temperature between about 750°C. and 1,000°C. by burning a fuel to produce a slightly oxidizing atmosphere.

7. The process as described in claim 3 wherein the liquid hydrocarbon is incorporated in the briquettes in amounts up to about 12 percent.

8. The process as described in claim 3 wherein the liquid hydrocarbon is incorporated in the briquettes in amounts between about 7 percent and 10 percent.

9. The process as described in claim 3 wherein the bed of briquettes is heated to 750°C. and 1,000°C. by burning a fuel with a free-oxygen-containing gas within the confined space.

10. The process as described in claim 9 wherein fuel is burned with a free oxygen-containing gas at a plurality of points within the confined space and those burners nearer the discharge end of the confined space are operated to produce a slightly reducing atmosphere while those burners nearer the charging end of the confined space are operated to produce a slightly oxidizing atmosphere.

* * * * *